May 21, 1963 L. G. THOMPSON 3,090,872

WAVEFORM TECHNIQUES

Filed Sept. 20, 1952 2 Sheets-Sheet 1

INVENTOR
LYLE G. THOMPSON
BY
Laurence R. Brown
ATTORNEY

May 21, 1963 L. G. THOMPSON 3,090,872

WAVEFORM TECHNIQUES

Filed Sept. 20, 1952

2 Sheets-Sheet 2

INVENTOR
LYLE G THOMPSON
BY
Laurence R. Brown
ATTORNEY

1

3,090,872
WAVEFORM TECHNIQUES
Lyle G. Thompson, Primos, Pa., assignor to Burroughs Corporation, Detroit, Mich., a corporation of Michigan
Filed Sept. 20, 1952, Ser. No. 310,602
34 Claims. (Cl. 307—88)

This invention relates to electronic circuits for the generation of waveforms and more particularly it relates to circuits utilizing saturable magnetic elements for providing time delay to electronic input signals.

The generation of different types of electronic waveforms is dependent upon the provision of reliable electronic delay devices. Delay devices which are sensitive to R-C time constant circuit and supply voltage variations are difficult to design to maintain accuracies in the order of ±5%, particularly when used with electronic tubes which may decrease in emission with aging. However, in many electronic computer circuits such accuracy must be attained to permit accurate calculating operations.

Many types of waveform generating circuits are therefore desired in the electronic computer art which are dependent upon a fixed time delay of high accuracy. When stepped incremental waveforms are used for the selection of different coded signals in many prior art circuits, however, variation in coding accuracy which may occur due to transient pulses or changes in the delay characteristics will cause erroneous results which are intolerable in a computer system. Special signal waveforms are therefore preferably generated without the accompanying transient energy which generally makes prior art circuits unsuitable for accurate operation.

It is desirable to provide circuits for obtaining time delay operation which are not dependent upon the changing characteristics of electron tubes or other circuit elements subject to aging. Those factors upon which the time delay is dependent therefore should depend upon fixed values not subject to change, such as the number of turns upon a saturable core reactor winding and the material of which the reactor core is constructed. These factors may be used to primarily establish the delay time if the delay interval is made dependent upon saturation of the reactor.

Static magnetic elements comprising saturable core reactors with "rectangular" hysteresis loop and high remanence characteristics have been utilized in the art to provide magnetic delay lines dependent upon external shift pulses to remove statically retained information from the permanently magnetized cores. Such prior art operation is described in an article entitled "Static Magnetic Storage and Delay Line," by A. Wang et al. in the Journal of Applied Physics, vol. 21, No. 1, dated January 1950. Low speed operation may be readily attained by such delay devices but they require a presetting excitation in a desired polarity before operation begins, which slows down the upper speed limit of operation of such devices. It would be desirable therefore to provide static magnetic delay circuits which do not require presetting signal actuation.

Accordingly, it is a general object of the invention to provide improved time delay devices affording those desirable characteristics hereinbefore mentioned.

It is a more specific object of the invention to provide time delay devices utilizing saturable magnetic elements wherein a time delay is afforded as a function of saturation in the magnetic element.

It is another object of the invention to provide highly accurate time delay circuits affording waveforms of the type useful in electronic computer circuits, and the like.

It is a further object of the invention to provide electronic delay means having high immunity to transient

2 noise impulses superimposed upon the desired waveform energy.

It is a still further object of the invention to provide high speed circuit operation with static magnetic elements having high remanence characteristics.

In accordance with the present invention there is therefore provided a saturable reactor with an associated winding adapted for saturating the reactor in response to signals from an external source of pulsating energy. When suitable current limiting means is coupled with the winding and the pulsating energy source, a predetermined amount of time delay may be established thereby before the winding is saturated. The time delay interval which may be attained depends upon fixed conditions in general, such as the material of which the saturable core is constructed, the number of turns in the winding, and the mean potential developed across the winding, which in conjunction with the current limiting means controls the magnetic flux intensity in the core. With the provision of stable current limiting means, the potential developed across the reactor winding may be controlled within very close tolerances, since the remaining variables are fixed. A high degree of accuracy is therefore provided in accordance with the present invention between the times the actuation pulse is supplied and the subsequent saturation is effected by the pulse.

A more detailed description of the invention, which follows, will point out further features of advantage. The description when considered in connection with the accompanying drawings will clearly indicate to those skilled in the art the nature of the invention and its manner of construction. Like reference characters will be used to designate similar circuit elements throughout the respective views of the drawings; in which.

Figure 1:
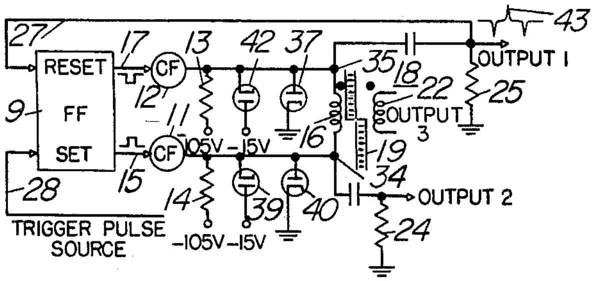
FIG. 1 is a schematic diagram of a stabilized time delay circuit constructed in accordance with the invention.
Figures 6, 8:
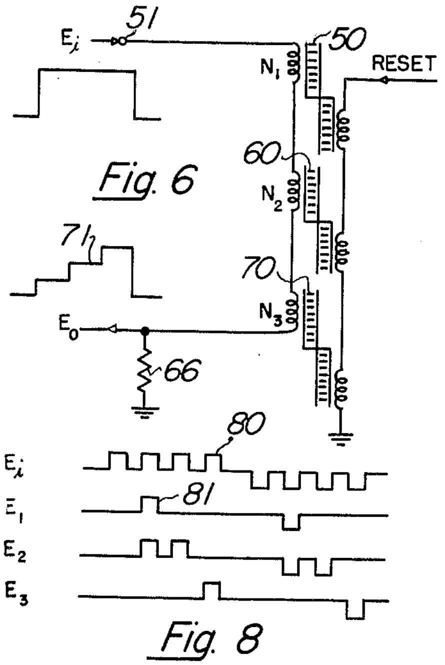
Figure 7:
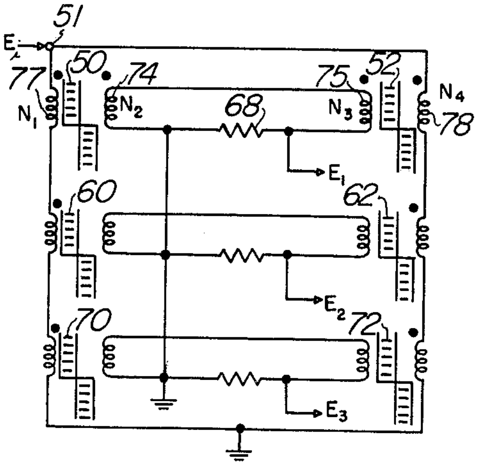

FIGS. 6 and 7 are schematic circuit diagrams of further embodiments of the invention; and FIG. 8 is a waveform representation illustrating certain operational aspects of the invention Referring now in particular to FIG. 1, a suitable bistable state flip flop circuit 9 is provided, which may be of the electronic tube type well known to those skilled in the computer art, if desired. Such a circuit is actuated from one bistable state to another in accordance with corresponding input pulses at set and reset input terminals respectively. In many cases where stability of operation is desired such circuits are isolated from further circuitry by means of succeeding cathode follower circuits 11 and 12 coupled to each of two output terminals 15 and 17 whereat complementary signal output waveforms are provided.

In accordance with the present embodiment of the invention the output impedance devices comprising cathode circuit resistors 13 and 14 of the respective cathode followers 11 and 12 are coupled to the two ends 34 and 35 of a saturating winding 16 upon the saturable core reactor 18. The core 19 of this reactor is preferably of the rectangular hysteresis characteristic type affording high magnetic remanence upon the application of a saturating signal, so that transient noise conditions will be reduced, as will be more fully described hereinafter. The diagrammatic core configuration therefore indicates a saturable material having a tendency to remain in one or the other polarity. Cores of this nature have been termed "static" magnetic elements and may be similar to those described in the aforementioned article by A. Wang et al.

Output signals may be taken from output terminals 1, 2 and 3 coupled to the reactor 18 respectively by means of differentiating circuits comprising the capacitively coupled resistors 24 and 25 and the transformer secondary winding 22. From output terminal 1 a signal is taken by way of feedback lead 27 to the reset input terminal of the flip flop circuit 9 to thereby automatically reset the circuit after a suitable time interval determined by the reactor 18. A source of pulsating energy is coupled to the input lead 28 at the set terminal of the flip flop device 9 for providing trigger or synchronizing pulses. In this manner one shot operation is afforded by a trigger pulse at input lead 28, which causes the flip flop circuit to go through one transition. A further transition, completing a single oscillation, is afforded by actuation of the saturable core reactor 18 in providing a pulse 43 at lead 27, whereby the flip flop circuit 9 is reset automatically. Accordingly, unistable state operation is obtained by this circuit with a resulting precisely determined delay time.

Control of the time delay afforded by the single shot flip flop operation may be obtained by regulation of the saturation of the core 19 by the current flowing through winding 16. For best results suitable core materials may be selected, such as the commercially available Deltamax and Molypermalloy, to provide desirable rectangular hysteresis characteristics affording a substantially constant saturating current with a fixed potential across the windings. Accordingly, the reactor behaves much in the manner of a simple resistor until saturation, and as a good conductor after saturation.

Figure 2:
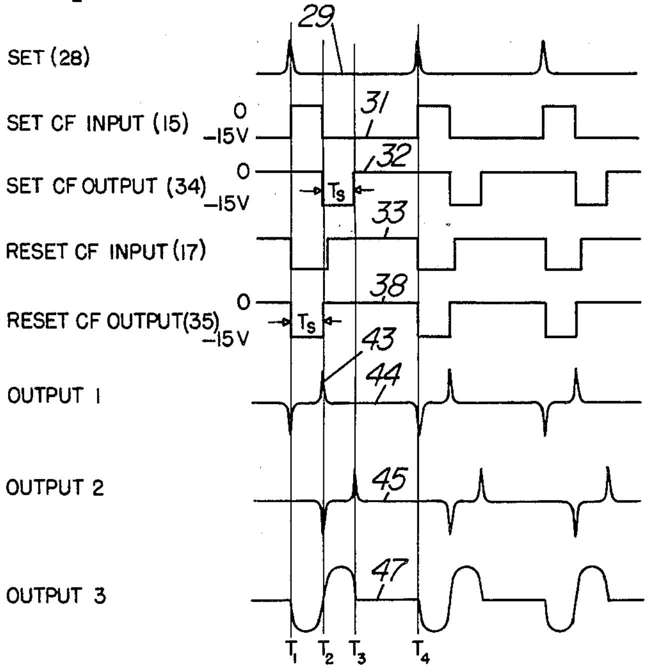
FIG. 2 is a graphical representation of idealized waveforms illustrating the operation of the invention as disclosed in the embodiment of FIG. 1.

The waveforms of FIG. 2 may be consulted to more readily understand the time delay operation of the unistable state device of FIG. 1. Thus, a trigger pulse waveform 29 arrives at the set terminal to cause a first transition of the flip flop circuit 9 at times $T_1$, $T_4$, etc. At the input lead 15 of the set cathode follower 11, the set transition waveform 31 is provided going from a level of at least −15 volts to zero. This assures operation of the clamping circuit 39 in the output circuit to establish a fixed potential of −15 volts. The cathode output lead 34 is maintained either by the 105 volt supply, resistor 14 and clamping diode circuit 39 at −15 volts or by the diode 40 at zero. The cathode follower output lead 34 however develops a waveform 32 which does not follow the input waveform 31 as in the usual cathode follower circuit. This results if it may be assumed that the cathode potential at terminal 34 is influenced by the potential at the reactor winding terminal. Since the potential of terminals 34 and 35 is different only when the reactor 18 is not saturated, the winding 16 acts as a short circuit when the reactor is saturated, causing the waveform 32 to differ from waveform 31.

Thus, consider that the flip flop circuit 9, when in reset condition, receives a suitable set trigger pulse at time $T_1$ at the lead 28. The operating condition established at lead 15 during transition as represented by waveform 31 tends to raise the potential at terminal 34 of the reactor winding 16 because of the cathode follower action. The circuit is however, already held at zero by voltage referencing means such as the clamping diode 40, and remains at that potential during a portion of the positive excursion of waveform 31 as shown in waveform 32. The reset cathode follower input terminal 17 is provided with a waveform 33 substantially complementary to waveform 31 at the grid input lead 15 of cathode follower 11 and therefore the cathode follower action establishes negative excursions which hold the cathode circuit 31 at the −15 volt clamping level of waveform 38 afforded by the voltage referencing diode 42. A difference is noted between the trailing edges of the waveforms 33 and 38 which is caused by a slight delay in triggering the reset terminal by pulse 43 derived from the trailing edge of the pulse of waveform 38.

Because the potential at reactor winding terminal 35 is changed at time $T_1$ to −15 volts and the potential at terminal 34 is zero, current will flow through winding 16 of the saturable reactor 18 from terminal 34 to terminal 35. This current flow saturates reactor 18 after a time interval $T_s$ (waveform 38) determined by the circuit parameters and the current limiting means in the circuit, which in this embodiment comprises the diode 42, the −105 volt supply, resistor 13 and −15 volt clamping bias source of cathode follower 12 and similar components of cathode follower 11. As the reactor saturates, the winding 16 becomes a good conductor and sufficient current will flow to raise terminal 35 to nearly the same potential as terminal 34, in this case zero.

This current flow in the winding 16 and saturation of the reactor 18 causes the terminal 35 to assume the zero potential level of terminal 34 and a positive output waveform 43 is therefore developed at time $T_2$ at output terminal 1 due to differentiation action. The positive portion 43 of waveform 44 is used to reset the flip flop circuit 9 and cause the return transition to the set condition indicated by the negative excursion of waveform 31 as well as the positive excursion of waveform 33. As before mentioned the input and output waveforms of cathode follower 12 are thereby slightly different near the trailing edge of the negative excursion. Thus, at time $T_2$, when the reactor winding terminal 35 is driven to zero, a transition occurs in flip flop circuit 9 which causes the negative excursion of waveform 31. The cathode circuit of cathode follower 11 may follow this excursion until clamped by diode 39. The resulting negative potential of −15 volt at terminal 34 and the zero potential at terminal 35 accordingly causes reversal of current flow through winding 16. A further time delay of $T_s$ (waveform 32) occurs before saturation of the reactor 18 in this opposite direction at time $T_3$. As the reactor is saturated in this direction to provide a short circuit between the reactor winding terminals 34 and 35, current flow increases through the winding 16 and resistor 14 from the conducting cathode follower 12 and now raises terminal 34 to zero potential established by clamping diode 37, which serves to keep terminals 34 and 35 at the equal potential of zero hereinbefore assumed. This condition prevails until the occurrence of a further trigger pulse at time $T_4$ at which time the circuit will recycle in the same manner.

A waveform 47 may be derived at the output winding 22 of the reactor 18 if desired. Also the waveform 45 at output 2 might be used as a trigger pulse source if desired, to cause automatic symmetrical oscillation of the circuit. Asymmetrical oscillations or output waveforms may be provided by choosing different clamping voltage levels at diodes 39 and 42, thereby causing different current limiting characteristics to be afforded at reactor 18 in the different half cycles of operation.

In the circuit described the delay time $T_s$ is solely a function of the flux required to saturate the reactor 18, which is generated by current in the winding 16. Saturation therefore is a function of the core material of the reactor, the number of turns on the reactor and the mean potential developed across the reactor winding. The delay time T may therefore be described by the relationship $$T=\frac{kN\Delta\varphi}{V}$$

where $k$ is a constant dependent upon the material of the core, $\Delta\varphi$ is the change of flux and V is the mean potential developed across the saturating winding of N turns. When a material having substantially rectangular hysteresis characteristics is utilized, the current flow through the reactor winding in response to an applied potential is such that the timing may be as precisely determined as the potential impress across the winding. In this embodiment therefore only the clamping voltage supply variations are effective in changing the delay time. The supply may readily be kept at a nearly constant potential, however, to thereby provide high timing accuracy.

In addition to the desirable hysteresis characteristics of the materials mentioned, a high degree of magnetic remanence is afforded thereby. When the cores are in one of their remanence polarities therefore any potential variations caused by transients or noise pulses tending to establish a magnetic flux in the same polarity as the remanence condition will provide very little output energy because of the saturable core characteristics. Accordingly, any transient noises or unwanted pulses occurring in this direction will be ineffective in disturbing the stability of operation. For this reason static magnetic elements are preferred over other types of saturable reactors.

Figure 3:
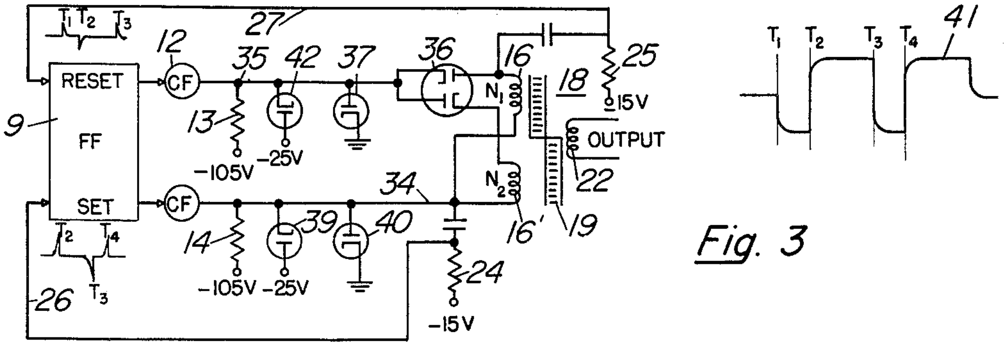
FIG. 3 is a schematic circuit diagram of an asymmetrical self-sustaining oscillator embodying the invention.

Precisely timed asymmetrical astable operation may be obtained in the same general manner by the circuit shown in FIG. 3. In this device, two saturating windings 16 and 16' are provided for the reactor 18 and a pair of diode rectifiers 36 is connected with a diode in series with each winding in an opposite polarity whereby saturation of the reactor in different directions is accomplished by means of different windings. Asymmetrical oscillations, such as shown in output waveform 41 may be obtained within a large range of time ratios $$\frac{T_1-T_2}{T_2-T_3}$$

by choosing the desired turns ratio $$\frac{N_1}{N_2}$$

in the respective saturating windings 16 and 16'. Provision of two feedback paths 26 and 27 affords self-sustaining oscillation. The time delay is dependent on the saturation of the reactor 18 as in the aforedescribed embodiment. Thus, the time delay characteristics of this embodiment provides reoccurring waveforms having a high degree of timing accuracy.

Figure 4:
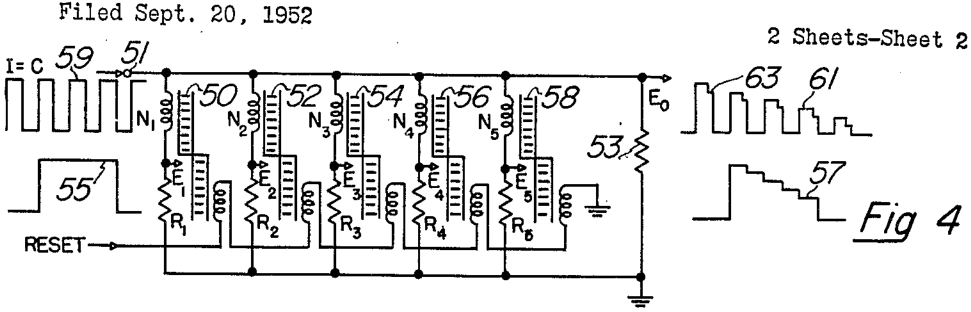
FIG. 4 is a schematic circuit diagram of a waveform generating circuit of the invention.

It is desirable in electronic counter circuits, and the like, to provide step waveforms where the amplitude is varied in terms of discrete time intervals. With such waveforms the timing interval between amplitude variations should be precisely maintained to avoid erratic circuit operation. A circuit for affording such step waveforms with the aforedescribed saturable magnetic elements is shown in FIG. 4.

In this embodiment, a plurality of saturable elements 50, 52, 54 etc. is connected in parallel across a source of pulsating energy coupled to terminal 51 and ground. Each of the saturable element cores have an associated winding which is selected to have a predetermined number of turns $N_1$, $N_2$ etc. The number of turns together with current limiting means such as resistors $R_1$, $R_2$ etc. connected in series with the windings thereby provide a different saturation time for each of the parallel connected saturable reactors. The resistor serves to apportion the potential applied to the winding from the input energy source by voltage dividing action, whereas the windings develop different amounts of flux from the same applied current dependent upon the number of turns they contain.

An output impedance device such as resistor 53 may therefore be connected in parallel with the delay means to develop an output potential $E_o$ from the corresponding input pulses, which may be derived from a constant current source in accordance with this phase of the invention. Consider first the relative long input pulse waveform 55 and the associated output waveform 57. Before saturation, each of the reactors presents a relatively high impedance to the current flow thereby causing a substantial part of the entire current to flow through output resistor 53, thereby developing a high output potential. As each core is saturated however, it presents a short circuit and the current is limited only by the associated resistor connected in series with the reactor winding. Accordingly, less current flows through the output resistor 53 and step waveform 57 results. It may be seen that the number of turns in the windings may be selected to provide relative saturation times in the different reactors, and the size of the resistor may be selected primarily to determine the relative amplitude variations of each step. Therefore the circuit represents a highly desirable means of obtaining accurately timed stepped waveforms having different easily varied characteristics suitable for many different electronic circuit applications.

When a group of input pulses 59 is provided, a similar stepped output waveform 61 is afforded with spaces in between steps corresponding to the time interval between the input pulses. In this manner, the individual pulse amplitudes may be more readily isolated as a function of time by suitable gating circuits, or the like. It is noted that each of the output pulses in waveform 61 is shown with a notched trailing edge 63. This results when the switching or saturation time of the individual elements is chosen to be less than the duration of the input pulse. Therefore the saturation takes place during the latter portion of the input pulse affording a notched wave. This is in effect a safety factor to assume stable switching since it would be difficult to design circuits or input pulse sources so that saturation always occurs exactly at the end of the pulse. Should the switching time be longer than the pulsing period, the leading edge of a succeeding pulse would have a high amplitude impulse superimposed thereupon which might tend to cause erroneous indication in gating circuits or other amplitude variation sensitive circuits at which the pulses are presented.

Figure 5:
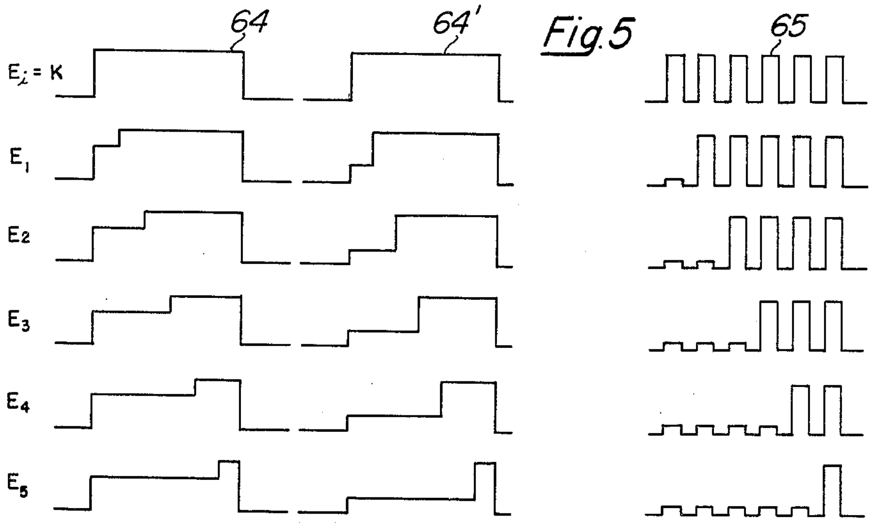
FIG. 5 is a graphical chart of waveforms illustrating different modes of operation of the circuit of FIG. 4.

Operation of the circuit with constant voltage input pulses is illustrated by the idealized waveforms of FIG. 5 in accordance with a further phase of the invention. In this type of operation consider the separate output pulses $E_1$, $E_2$ etc. to be developed across the corresponding resistors $R_1$, $R_2$ etc. associated with each of the corresponding saturable elements 50, 52, etc. Because of the constant voltage characteristics of the input pulses the potential across each resistor after saturation will be of substantially the same amplitude as the input pulse. In considering the respective windings as simple resistors when unsaturated, there will be a potential developed across the windings before saturation from the voltage divider action of the resistor and winding in series. Accordingly, at each output terminal $E_1$ etc. the single step output waveforms of FIG. 5 are obtained from the relatively long input waveform 64, wherein the time delay and the amplitude is mainly dependent upon the relative ratios of impedance of the winding and resistor associated therewith. Thus, the steps may be selected to have varying times and amplitudes to suit the needs of any particular utilization circuit. Difference in amplitudes of the steps as determined by different circuit parameters is noted in comparing the output waveforms of FIG. 5 associated with the respective input waveforms 64 and 64'.

With a constant potential group of input pulses 65 this circuit may be made to perform pulse counting operations. The input waveform 65 and associated output waveforms $E_1$ to $E_5$ illustrate this aspect of the invention. The output amplitude before saturation is made very small as compared with the amplitude of the input waveform so that the remaining high amplitude pulses may be readily separated by amplitude responsive means.

Similar step waveforms to those described hereinbefore may be obtained by connecting the saturable elements in series as shown in FIG. 6. In this embodiment, the series connected reactors 50, 60 and 70 each have a different saturation time mainly determined by the number of turns $N_1$, $N_2$, $N_3$ in the respective saturating windings. A constant potential input pulse therefore will assume a stepped output characteristic 71 across an output impedance device 66 connected in series with the saturating windings. Each step occurs as one of the windings becomes saturated and thereby becomes a short circuit effectively removing one section of the voltage divider network.

When different pulse coding patterns are desired at different circuit positions in response to a single train of input pulses, the circuit of FIG. 7 may be utilized. Here windings 77, on a first column of magnetic cores 50, 60 and 70, are connected in series with one another and in parallel with series windings 78 on a second column of cores 52, 62 and 72. Also, windings 77 and 78 are connected in parallel with a pulsating input signal source $E_1$ which is connected between input terminal 51 and ground. In this circuit current is limited in the series windings 77 and 78 by the relatively high impedance afforded by each such winding which is on an unsaturated core. The time interval of this high impedance condition is the time required to switch or saturate the core, since saturation of the core gives rise to a low impedance condition.

An additional winding is provided on each of the magnetic cores for providing coupling circuits between corresponding cores of the two columns. Cores 50 and 52, for example, contain windings 74 and 75 which have $N_2$ and $N_3$ turns, respectively, and are connected in a coupling circuit including a series resistor 68. When core 50 is being switched by a positive current from top to bottom through upper winding 77 a positive voltage will be induced across winding 74 which will appear as a positive voltage at terminal $E_1$. Likewise, when core 52 is being switched by positive current from top to bottom through upper winding 78 a negative voltage will be induced across winding 75 which will appear as a negative voltage at terminal $E_1$.

If cores 50 and 52 are similar and the turns $N_2$ and $N_3$ of their windings 74 and 75 are equal in number, the voltage induced across such windings during the time cores 50 and 52 are both switching will be substantially equal. Therefore, so long as these cores 50 and 52 are both simultaneously switching, these voltages will cancel one another and no voltage will appear at terminal $E_1$. However, should one of these cores completely switch or saturate before the other, no further voltage will be induced in its associated winding and hence a net output voltage would appear at terminal $E_1$. This condition will exist until the other core switches. The polarity of this output voltage will of course depend upon which of the cores is first to completely switch and, also, upon the winding orientation and relative turns ratios. If, on the other hand, turns $N_2$ and $N_3$ of windings 74 and 75 were unequal in number the voltage pulses induced across these windings (during the time cores 50 and 52 are both switching) will not be equal and, hence, the difference between these voltages will appear at terminal $E_1$. Such an arrangement may therefore be used to provide different amplitudes in the output voltage pulses depending upon whether both cores are switching, or one has completed switching, or both have completed switching. Cores 60 and 62 operate in like manner, as do cores 70 and 72. Accordingly, the circuit of FIG. 7 is extremely flexible for providing different patterns of useful coded output waveform energy.

By choosing different numbers of turns $N_1$ and $N_4$ in the respective saturating windings 77 and 78 the relative speeds of saturation of cores 50 and 52 can be selectively controlled and hence the output pulse trains developed at the various output terminals $E_1$, $E_2$ and $E_3$ selectively delayed in time to provide different voltage patterns at these three terminals. This may be seen by considering the circuit of FIG. 7 in conjunction with the waveforms of FIG. 8. FIG. 8 shows input waveform 80 which is applied to terminal 51 of FIG. 7 and the corresponding output signals $E_1$, $E_2$ and $E_3$ developed at the respective output terminals. The conditions discussed hereinafter prevail to provide the shown pattern. Other desired pulse patterns may readily be derived by those skilled in the art for operation in any desired sequence.

To obtain the waveform 81 of FIG. 8 the turns $N_1$ and $N_4$ of windings 77 and 78 are chosen so that both of cores 50 and 52 are switching during the period of the first input pulse of pulse train 80, thereby causing equal but opposing potentials to be induced in windings 74 and 75, and no net output signal at terminal $E_1$. Core 52, however, is completely switched into saturation by this pulse and hence the second input pulse in pulse train 80 induces a positive voltage across winding 74 but no further opposing potential across winding 75. This results in a positive output pulse 81 at terminal $E_1$. Such second input pulse, however, completely switches core 50 into saturation and hence no further output voltage is induced across either of windings 74 or 75 and, as a consequence, no further output voltage is produced at terminal $E_1$. This is shown by waveform 81. By like reasoning the output waveform $E_2$ of FIG. 8 may be derived by choosing the windings on cores 62 and 60 so that these cores are completely saturated by the first and third input pulses, respectively, and waveform $E_3$ may be derived by choosing the windings on cores 72 and 70 so that these cores are completely switched by the third and fourth input pulses, respectively.

Referring back to FIGS. 4 and 6, it is noted that reset windings are provided for establishing an initial polarity in the desired static magnetic elements indicated by the schematic core configurations of the elements. Thus, after every operation a reset pulse is provided before a further operational step can occur thereby substantially reducing the maximum system speed. If a reversible operation is afforded however, no reset need be accomplished and operation may be speeded up by simply reversing the polarity of the input pulses. This expedient is possible only when all the static magnetic elements are established in one polarity at the end of the input pulsing interval. Then reversal of input signal polarity will cause all the elements to establish the opposite polarity.

Such an operating technique is indicated by the input signal $E_1$ shown in FIG. 8 where reciprocating or alternating groups of positive and negative input signal pulses are presented at the input terminal 51 of FIG. 7. In this respect the output signal will be identical in pulse selection but also reversed in polarity so that the system speed is increased by providing suitable means for periodically reversing input signal polarities applied to the static magnetic elements and means for utilizing reversed output pulses derived therefrom.

The circuit of FIG. 3 has a single saturable element likewise excited by opposite polarity pulsating energy during successive signal pulsing periods and thereby providing automatically continuous operation without external reset signal actuation.

In accordance with the foregoing teachings of the invention therefore, it is to be recognized that saturable elements may be used for obtaining various types of desirable waveforms wherein different amplitude or polarity variations occur after a precisely determined delay interval. The described embodiments are representative of the invention, but it is to be understood that throughout the foregoing description embodiments are shown which suggest certain variations to those skilled in the art which do not depart from the spirit or scope of the invention. Those features believed descriptive of the nature of the invention are defined with particularity in the appended claims.

I claim:

1. An electronic time delay circuit including a saturable magnetic core reactor winding, current limiting means serially connected with said winding, and a source of pulsed electrical energy coupled to the series circuit for saturating said reactor, the current limiting means and reactor having such an impedance ratio that a time delay of substantially $$T=\frac{kN\Delta\varphi}{V}$$

elapses between input impulses for said source and output pulses derived from said reactor, where k is a constant, N the number of turns in said winding, $\Delta\varphi$ is the change of magnetic flux in said reactor and V is the mean potential developed across the reactor winding.

2. The combination of a flip flop circuit and a saturable reactor device having a winding coupled to complementary output terminals of said flip flop circuit, reactor terminals coupled to said winding, and circuit parameters causing a time delay between the signal at said flip flop circuit and said reactor output terminals.

3. In combination, a saturable reactor device having a winding with two terminals, a pulsating energy source including a flip flop circuit for providing reciprocating output signals, a circuit coupling the reciprocating signals of said energy source to said two terminals, and an output circuit coupled to said winding providing output signals delayed in time from the pulsating input energy.

4. A single-shot oscillator circuit comprising in combination, a bistable state device having output terminals adapted to provide complementary output signals in accordance with set and reset input signal actuation, a cathode follower circuit connected to each output terminal, voltage referencing means connected in the output circuit of each cathode follower, a static magnetic reactor element with a winding coupled to both said voltage referencing means, means resetting said bistable state device with signals coupled from said reactor element, and set signal actuation means adapted for application of a trigger signal thereby to cause oscillation of said bistable state device once for each actuation by a trigger input pulse.

5. An oscillator circuit comprising in combination, a bistable state device having two input terminals for set and reset signal actuation respectively, a saturable core reactor winding coupled to two output terminals of said device, voltage referencing means connected to said winding, and means coupling an output potential developed during saturation of the reactor to the reset input terminal in such polarity that the circuit is automatically reset.

6. An oscillator circuit as defined in claim 5 wherein means couples, a further signal from the reactor to the set terminal in such polarity as to cause self-sustaining oscillations.

7. An oscillator circuit as defined in claim 6 wherein a further reactor winding is provided, and the unidirectional devices are coupled between each winding and one of the output terminal windings are provided with an unequal number of turns, thereby effecting asymmetrical oscillations.

8. A circuit comprising in combination, a pulsating energy source, and a plurality of saturable windings and associated current limiting means coupled in parallel circuit with said source, each of said windings have parameters such that they saturate after different times with the pulsating energy from said source.

9. A circuit as defined in claim 8 wherein output potential developing means is connected in parallel with said source.

10. A circuit as defined in claim 8 including output signal means connected to said current limiting means.

11. A circuit as defined in claim 8 wherein each winding and limiting means associated therewith have a set of parameters affording saturation current through the different windings at different time increments.

12. A circuit as defined in claim 11 wherein the energy source provides groups of evenly spaced pulses.

13. A circuit comprising in combination, a plurality of saturable reactor windings, a pulsating energy source, means coupling a portion of said windings in series with said source, further means connecting a further portion of said windings in shunt with the first said windings, and means coupling windings in the first said portion with windings in the further said portion including a signal developing impedance device.

14. A circuit as defined in claim 13 wherein each set of coupled windings has circuit parameters affording different time increments between application of energy from said source, the saturation of windings in one portion and the saturation of windings in the other portion.

15. An electronic circuit comprising in combination, a bistable state reactor, a pulsating energy source, current limiting means connecting said source to said reactor to afford a change in the state of said reactor after a time increment, and a circuit causing said reactor to be excited by pulsating energy from said source in two polarities during successive signal pulsing periods.

16. A circuit as defined in claim 15 wherein the pulsating energy source is a bistable state device, two circuits are coupled with said reactor, and the bistable state device is connected by said circuits to provide said excitation alternatively in said windings.

17. A circuit as defined in claim 15 wherein the reactor is a saturable core magnetic device having high magnetic remanence characteristics and said pulsating energy source provides signals comprising groups of pulses of alternate polarity to said reactor to thereby afford operation without reset pulse actuation of said reactor.

18. A static reactor amplifier system for continuous operation without reset actuation comprising a plurality of static reactor elements connected in a circuit, means for applying at a single input terminal pulsating signal energy of alternating presented polarities to all said elements during a cycle establishing a predetermined remanence polarity in each element and for applying signal energy of opposite polarity to establish remanence of opposite polarity in said elements during a successive cycle, and current limiting means affording a predetermined time delay before establishing remanence in either polarity.

19. Time delay means comprising in combination, a saturable core reactor having a winding with two terminals, current limiting means connected in circuit with said winding, a pulsating electrical input energy source coupled to said circuits, output utilization means coupled to said reactor to utilize energy developed during saturation of said reactor whereby delay in application of energy to said utilization means is a function of the saturation energy applied to said reactor from said source by said current limiting means, a flip flop circuit having terminals providing complementary output signals, a circuit coupling said output signal terminals to different terminals of said reactor through cathode follower means, a feedback circuit coupling the reactor winding to one input terminal of said flip flop circuit, a circuit coupling another input terminal of said flip flop circuit to said pulsating source, whereby a trigger pulse provides one-shot flip flop operation, and potential clamping means included in said current limiting means being connected to each reactor terminal to cause the potential across said reactor terminals to become substantially constant, whereby the transition time intervals dependent upon saturation time of said reactor are precisely determined within close limits.

20. Time delay means comprising in combination, a saturable core reactor having a winding with two terminals, current limiting means connected in circuit with said winding, a pulsating electrical input energy source coupled to said circuit, output utilization means coupled to said reactor to utilize energy developed during saturation of said reactor whereby delay in application of energy to said utilization means is a function of the saturation energy applied to said reactor from said source by said current limiting means, a further winding on said reactor with a different number of turns than the first winding, said pulsating source comprising a flip flop circuit having complementary output signals, a circuit coupling the complementary signals respectively to terminals on each of said windings, a pair of rectifiers coupled in opposite polarity between one of said signal output terminals and one end of both windings to assure saturation in opposite polarities from current flow in different ones of said windings, and a circuit coupling output signals from the different reactor windings respectively to set and reset input terminals of said flip flop circuit, whereby asymmetrical self-sustaining oscillations are obtained.

21. Time delay means comprising in combination, a saturable core reactor having a winding with two terminals, current limiting means connected in circuit with said winding, a pulsating electrical input energy source coupled to said circuits, output utilization means coupled to said reactor to utilize energy developed during saturation of said reactor whereby delay in application of energy to said utilization means is a function of the saturation energy applied to said reactor from said source by said current limiting means, means deriving said pulsating energy from a constant current source, said current limiting means comprising a resistive circuit connected in series with said winding, and an output impedance device connected in shunt with the series resistor-winding combination to thereby provide a stepped waveform output potential upon saturation of said reactor.

22. Time delay means comprising in combination, a saturable core reactor having a winding with two terminals, current limiting means connected in circuit with said winding, a pulsating electrical input energy source coupled to said circuits, output utilization means coupled to said reactor to utilize energy developed during saturation of said reactor whereby delay in application of energy to said utilization means is a function of the saturation energy applied to said reactor from said source by said current limiting means, means deriving said pulsating energy from a constant potential source, said current limiting means comprising a resistive circuit connected in series with said winding, and means connecting said output utilization means with said resistive circuit.

23. Time delay means comprising in combination, a saturable core reactor having a winding with two terminals, current limiting means connected in circuit with said winding, a pulsating electrical input energy source coupled to said circuits, output utilization means coupled to said reactor to utilize energy developed during saturation of said reactor whereby delay in application of energy to said utilization means is a function of the saturation energy applied to said reactor from said source by said current limiting means, at least one further winding on the saturable core reactor connected in series with said reactor winding, said limiting means comprising a resistive device connected in series with all said windings, and means connecting said utilization means to said resistive device.

24. Time delay means comprising in combination, a saturable core reactor having a winding with two terminals, current limiting means connected in circuit with said winding, a pulsating electrical input energy source coupled to said circuits, output utilization means coupled to said reactor to utilize energy developed during saturation of said reactor whereby delay in application of energy to said utilization means is a function of the saturation energy applied to said reactor from said source by said current limiting means, at least one further winding on the saturable core reactor connected in series with said reactor winding to form a first series circuit, a plurality of other saturable core reactors coupled with a corresponding number of series windings in a second series circuit connected in parallel with the first series circuit, a further winding provided for each reactor, and a circuit connecting said further windings of a pair of corresponding reactors connected respectively in the first and second circuits and a load impedance device in series, said energy source being coupled across said parallel connected circuits and said utilization means being connected to said load device.

25. In a magnetic device, two cores of magnetic material each characterized by being capable of switching to magnetic remanence conditions of either a positive or a negative polarity, a winding inductively coupled to each of said cores and connected to each other in series, one of said windings having a substantially greater number of turns than the number of turns of the other winding, a pulse source connected in series with said windings in such polarity as to tend to switch both cores to the same reference remanence condition, the power of the pulses supplied from said source being so related to the respective impedances of the two windings that when the two cores are of the same magnetic polarity each pulse will switch to the opposite magnetic polarity only the core having the winding with the larger number of turns leaving the other core unswitched.

26. An electronic circuit comprising in combination, means providing pulsating signal energy, a saturable core reactor winding of a specified number of turns connected to said means and adapted for saturation by said signal energy, and current limiting means comprising a further saturable core reactor winding of a lesser number of turns than the specified number of turns of said first mentioned winding to establish a predetermined time delay before saturation of first mentioned winding by said signal energy.

27. A circuit comprising in combination a network including a pulsating energy source, a plurality of magnetic saturable reactor windings, and current limiting means for each of said reactor windings coupled in series with the respective windings across said pulsating energy source, said current limiting means together with the reactor windings providing impedance values for each of said reactor windings such that each of the windings is driven to saturation at a different time by said pulsating energy source.

28. In a magnetic device, two cores of magnetic material, each characterized by being capable of switching to magnetic remanence conditions of either a positive or negative polarity, a winding inductively coupled to each of said cores with each of said windings having unequal numbers of turns, a circuit connecting said windings in series, means for switching at least one of said cores, and means connected with said series windings to produce an output indication in response to switching of said cores.

29. Means for selectively producing pulses of low or high amplitude at a load circuit comprising in combination, an input signal pulse source for producing high amplitude pulses, a bistable state magnetic switching element having a winding with one terminal coupled to the input signal source in such polarity that the element tends to switch to a first state, means for resetting said element to its second state, and a load circuit element coupled in series with said winding across said source to receive high amplitude signals from said source when the switching element is in the first state thereby appearing essentially as a short circuit for the signal pulse and to receive low amplitude signals when the element is in the second state thereby appearing as a high impedance to substantially increase the signal amplitude at the element and accordingly reduce the signal amplitude available at said load circuit.

30. Means for selectively gating a signal pulse source to a load circuit comprising in combination, a bistable state magnetic switching element having a switching winding, a circuit coupling said switching winding and said load circuit in series circuit across the signal pulse source, and means for establishing the magnetic switching element in either predetermined state so that the signal pulse is selectively developed at the switching element or at the load circuit in response to the storage state of the switching element to thereby serve to gate the signal pulse source to the load circuit.

31. In a magnetic core circuit, first and second cores, a circuit including a winding on the first core and a winding on the second core, means for applying a voltage of predetermined amplitude across said circuit, and wherein the winding on the first core has a greater number of turns than the winding on the other core, and the windings are connected in series in the circuit, whereby with both cores initially in such state as to be shiftable into a new remanence state by current through the circuit, the impedance offered to the circuit by both windings will restrict the amount of current flowing to such amount that only the core having the windings of the greater number of turns will be shifted, but when the first mentioned core has shifted the reduced impedance presented to the circuit will increase the current whereby the other core shifts notwithstanding the lesser number of turns of the winding thereon.

32. A circuit as in claim 31 wherein the means for applying a voltage of predetermined amplitude across said circuit includes means for applying same in repetitive pulses.

33. An electronic circuit comprising, in combination, a magnetic core characterized by a substantially rectangular hysteresis loop, a conductor coupled to such core, means providing pulsating signal energy to said conductor for driving the core into saturation in response to said signal energy, and limiting means connected to said conductor establishing the signal energy across said conductor at a fixed potential level while the core is being driven to saturation to establish a predetermined time delay before saturation of the core by said signal energy.

34. An electronic circuit for generating output pulses of a desired duration in response to input pulses of a different duration comprising a switching element having a plurality of stable remanent states, at least one of which is a saturation state, a conductor coupled to such element, means providing pulsating signal energy of saturation amplitude to said conductor to switch said element from one stable remnant state to said saturation remnant state, means establishing the signal energy applied to the conductor at a fixed potential during the switching of said element to saturation, and output circuit means responsive to the switching of said element for providing an output pulse of a duration equal in time to that required to switch the element to saturation.

References Cited in the file of this patent

UNITED STATES PATENTS

| | | |
|---|---|---|
| 2,478,911 | Francis | Aug. 16, 1949 |
| 2,585,545 | Gannett | Feb. 12, 1952 |
| 2,591,406 | Carter et al. | Apr. 1, 1952 |
| 2,652,501 | Wilson | Sept. 15, 1952 |
| 2,680,819 | Booth | June 8, 1954 |
| 2,722,603 | Dimond | Nov. 1, 1955 |